(12) United States Patent
Tegnell et al.

(10) Patent No.: US 10,165,043 B2
(45) Date of Patent: Dec. 25, 2018

(54) MULTI-CORE DEVICE WITH SEPARATE REDUNDANCY SCHEMES IN A PROCESS CONTROL SYSTEM

(71) Applicant: Invensys Systems, inc., Foxboro, MA (US)

(72) Inventors: Johan Ingemar Tegnell, Mansfield, MA (US); John Joseph Lavallee, Wrentham, MA (US); Alan Andrew Gale, Windham, ME (US); Miroslav Radomirov Radev, Mansfield, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 450 days.

(21) Appl. No.: 14/872,590

(22) Filed: Oct. 1, 2015

(65) Prior Publication Data

US 2017/0097617 A1    Apr. 6, 2017

(51) Int. Cl.
| | | |
|---|---|---|
| *G05B 15/02* | (2006.01) | |
| *H04L 29/08* | (2006.01) | |
| *G05B 9/03* | (2006.01) | |
| *G06F 15/173* | (2006.01) | |
| *G06F 9/50* | (2006.01) | |
| *H04L 29/14* | (2006.01) | |

(52) U.S. Cl.
CPC ............... *H04L 67/10* (2013.01); *G05B 9/03* (2013.01); *G06F 9/50* (2013.01); *G06F 15/173* (2013.01); *H04L 69/321* (2013.01); *H04L 69/40* (2013.01)

(58) Field of Classification Search
CPC .............................. G05B 15/02; H04L 67/10
See application file for complete search history.

(56) References Cited

U.S. PATENT DOCUMENTS

| 6,594,530 | B1 * | 7/2003 | Glanzer | G05B 15/02 |
| | | | | 700/17 |
| 8,516,355 | B2 * | 8/2013 | Gale | G06F 11/1679 |
| | | | | 714/807 |
| 8,732,556 | B2 * | 5/2014 | Gale | G06F 11/1679 |
| | | | | 714/12 |
| 8,745,467 | B2 * | 6/2014 | Gale | G06F 11/1633 |
| | | | | 714/12 |
| 8,966,340 | B2 * | 2/2015 | Gale | G06F 11/1633 |
| | | | | 714/758 |

(Continued)

*Primary Examiner* — Umut Onat
(74) *Attorney, Agent, or Firm* — Stinson Leonard Street LLP

(57) ABSTRACT

A multicore system controls devices in a process control system. A primary control processing device having a primary master core and a primary remote core is configured for controlling communications on a first network among a first plurality of devices. The primary remote core is configured for controlling communications on a second network among a second plurality of devices. A shadow control processing device is coupled to the first and second networks for processing redundant communications among the devices. The shadow control processing device comprises a shadow master core and a shadow remote core. The shadow master core is configured for controlling communications on the first network among the first plurality of devices. The shadow remote core is configured for controlling communications on the second network among the second plurality of devices.

20 Claims, 12 Drawing Sheets

(56) References Cited

U.S. PATENT DOCUMENTS

| | | | | |
|---|---|---|---|---|
| 2012/0210198 A1* | 8/2012 | Gale | ................... | G06F 11/1679 |
| | | | | 714/807 |
| 2012/0210199 A1* | 8/2012 | Gale | ................... | G06F 11/1633 |
| | | | | 714/807 |
| 2013/0339788 A1* | 12/2013 | Gale | ................... | G06F 11/1679 |
| | | | | 714/16 |
| 2014/0257529 A1* | 9/2014 | Dicaire | ................... | G05B 15/02 |
| | | | | 700/79 |
| 2016/0076664 A1* | 3/2016 | Erni | ................... | F16K 37/0075 |
| | | | | 700/282 |

* cited by examiner

MULTI-CORE DEVICE WITH SEPARATE REDUNDANCY SCHEMES IN A PROCESS CONTROL SYSTEM

BACKGROUND

Aspects of the present invention relate of the fields of networked computerized industrial control and automation systems. Such systems generally comprise process controller devices, which are typically connected via networks to large quantities of field devices throughout a process control system. Field devices in a process come in a variety of types and functionalities and may be created by many different vendor companies. Controlling the huge variety of field devices in concert is a vital task for ensuring the productivity of process control systems.

Typical industrial processes today are extremely complex and involve many intelligent devices such as transmitters, positioners, motor drives, limit switches, and other communication enabled devices. By way of example, it is not unheard of to have thousands of sensors and control elements (e.g., valve actuators) monitoring/controlling aspects of a multi-stage process within an industrial plant. As field devices have become more advanced over time, the process of controlling and synchronizing the field devices has also increased in complexity.

In previous generations of industrial process control equipment, and more particularly field devices, transmitters and positioners were comparatively simple components. Before the introduction of digital (intelligent) transmitters, activities associated with a field device were relatively simple. Industry standards like 3-5 psi for pneumatic instruments or 4-20 ma for electronic instruments allowed a degree of interoperability that minimized setup, configuration, and operation of analog transmitters.

More contemporary field devices that include digital data transmitting capabilities and on-device digital processors, referred to generally as "intelligent" field devices, require significantly more configuration effort when setting up a new field device. Management of complex, intelligent devices requires a variety of different software interfaces, protocols, and drivers to ensure efficient interaction with each type of device.

SUMMARY

Aspects of the present invention permit controlling separate sets of devices with a single processing device comprising multiple cores, wherein each core controls a set of devices. Moreover, each core implements a type of redundancy scheme.

In one form, a multicore system for enabling control of devices in a process control system is provided. The system has a primary control processing device coupled to a first network of a first plurality of devices and a second network of a second plurality of devices for processing communications among the devices. The primary control processing device comprises a primary master core and a primary remote core. The primary master core is configured for controlling communications on the first network among the first plurality of devices. The primary remote core is configured for controlling communications on the second network among the second plurality of devices. The system further comprises a shadow control processing device coupled to the first and second networks for processing redundant communications among the devices. The shadow control processing device comprises a shadow master core and a shadow remote core. The shadow master core is configured for controlling communications on the first network among the first plurality of devices. The shadow remote core is configured for controlling communications on the second network among the second plurality of devices.

In another form, a method for controlling multiple sets of devices using a multi-core processing device is provided.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
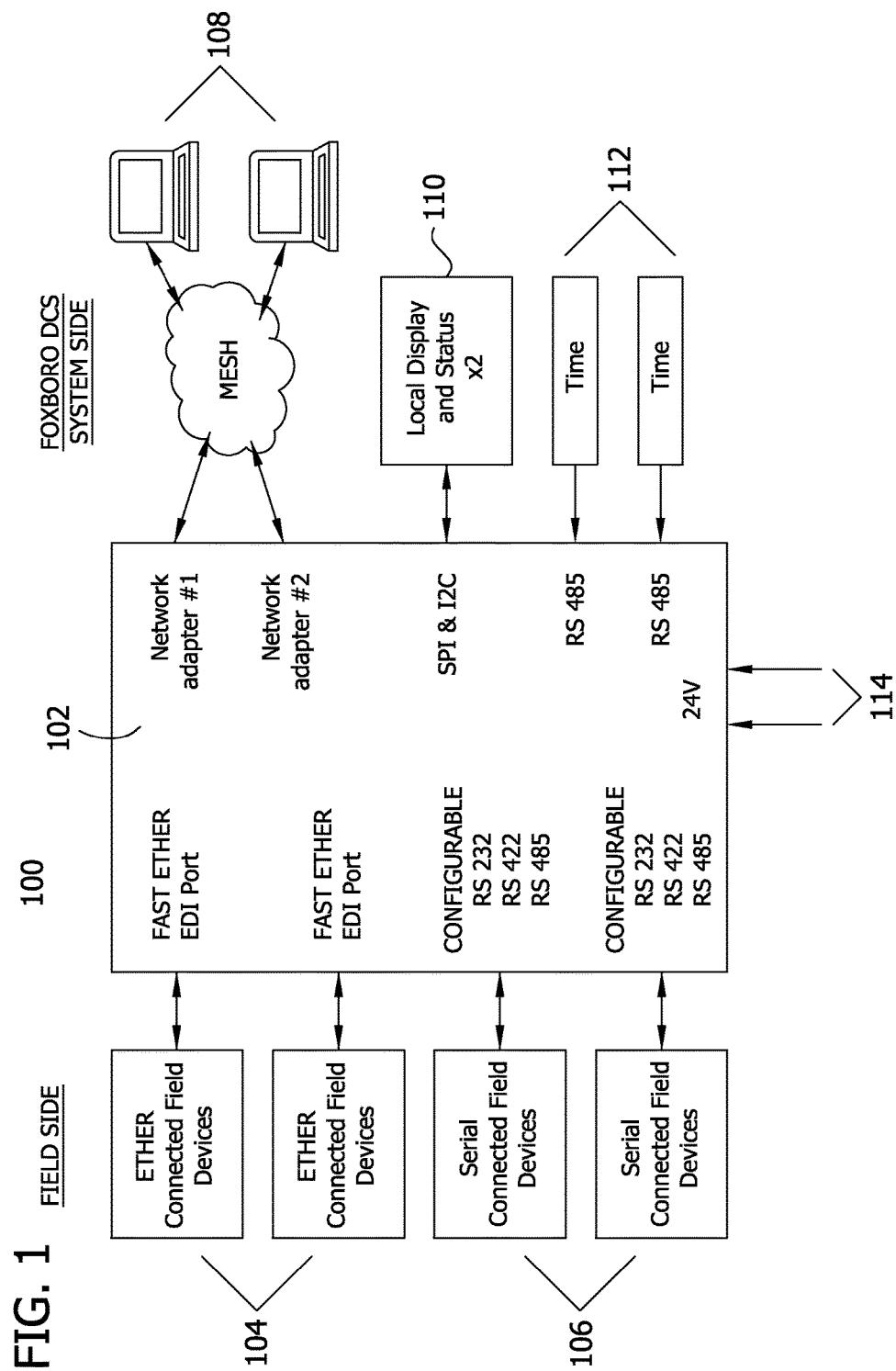
FIG. 1 is a block diagram of an exemplary process control system employing an embedded external device integrator (eEDI) device according to an embodiment of the invention.

Referring to FIG. 1, a process control system 100 embodying aspects of the invention comprises an embedded external device integrator (eEDI) device 102. FIG. 1 shows the eEDI device 102 configured for communication with other devices in the process control system 100. The communications between the eEDI device 102 and other devices of process control system 100 comprise requests and commands from the eEDI device 102 to the other devices and responses and other data from the other devices to the eEDI device 102. The eEDI device 102 is connected to a power source 114 and a clock signal 112, which enables the eEDI 102 and modules therein to operate in synch. In an embodiment, the eEDI device 102 connects to one or more interface devices 110, which are used to communicate information such as status information from the eEDI device 102. The interface devices 110 may communicate via a visual display or other interface.

The devices of process control system 100 connected to the eEDI device 102 are configured to communicate through various types of interfaces. A first set of devices are field devices 108 connected to the eEDI device 102 through MESH network connections. A second set of devices are Ethernet field devices 104 connected to the eEDI device 102 through Ethernet connections. A third set of devices are Serial field devices 106 connected to the eEDI device 102 through Serial connections. In an embodiment, the eEDI communicates with Serial devices using the MODBUS protocol. In an embodiment, the eEDI device 102 may connect to other types of devices and use other types of communication protocols as understood by a person of ordinary skill in the art.

Figure 2:
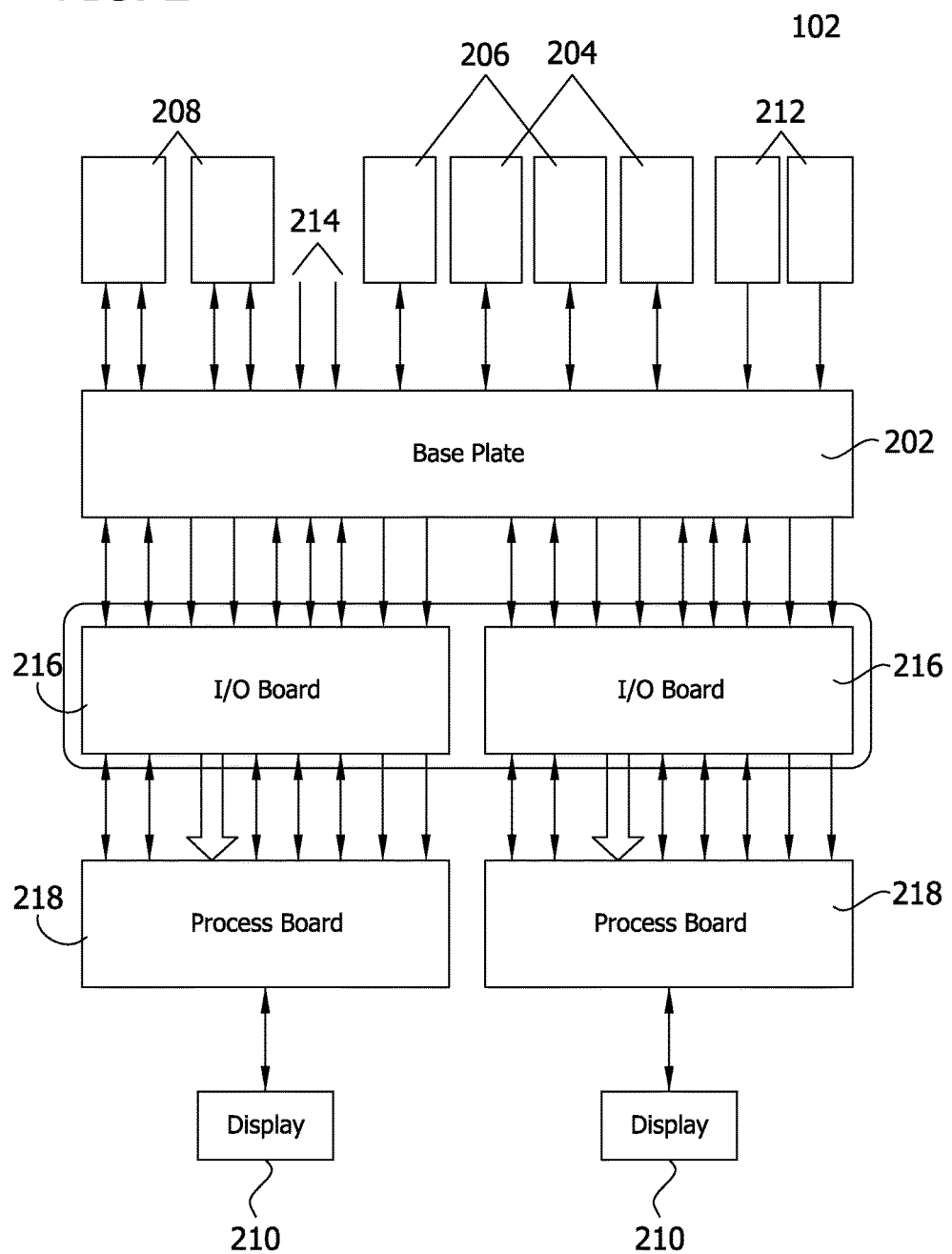
FIG. 2 is a diagram of exemplary hardware layers of the eEDI of FIG. 1.

Referring to FIG. 2, an embodiment the eEDI device 102 comprises several hardware layers. The eEDI device 102, in an embodiment, comprises one or more processor modules on a base plate 202, which connects the eEDI device 102 to external connections. Directly attached to the base plate 202 are I/O boards 216 of the processor modules. The I/O boards 216 act as a conduit between the base plate 202 and processor boards 218. The processor boards 218 execute all of the processing tasks for the eEDI device 102. Displays 210 are connected to the processor boards 218 in order to monitor the activity of the eEDI device 102. Through the base plate 202, the eEDI device 102 interacts with MESH networks 208, serial connected field equipment 206, and Ethernet connected field equipment 204. The eEDI device 102 is powered by a power supply 214 connected through the base plate 202, and processing of the eEDI device 102 is synchronized based on time synch signals 212. An embodiment of the I/O boards 216 provide low voltage power to the processor boards 218 by transforming higher voltage power from the base plate 202 to the desired voltage.

Figure 3:
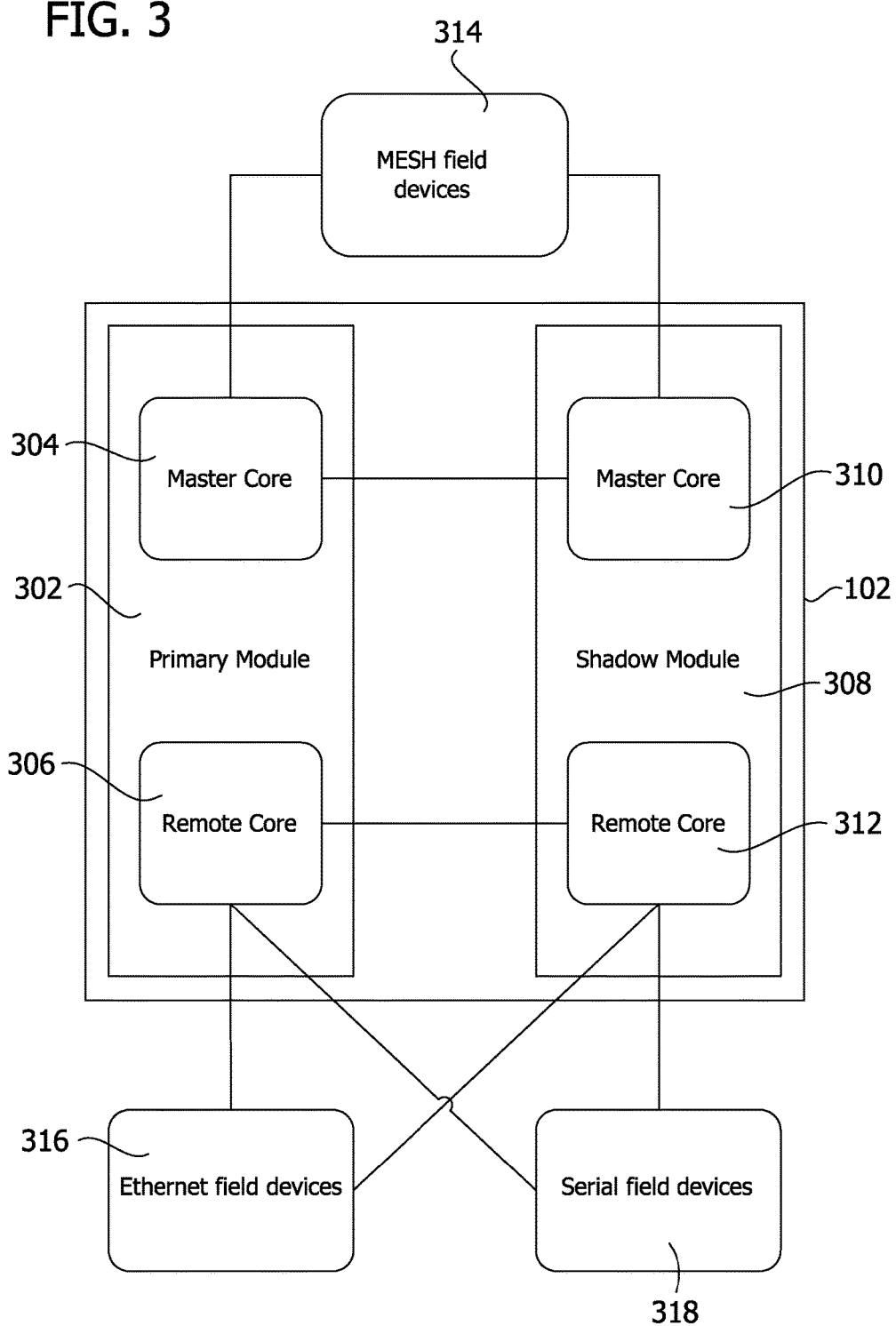
FIG. 3 is a diagram of the eEDI of FIG. 1 further illustrating redundant processing modules and multiple cores.

In an embodiment, the eEDI device 102 comprises a processor with multiple cores capable of executing processes in parallel. Referring to FIG. 3, the separate cores of the processor are each assigned processing tasks. A primary processor module 302 includes a master core 304 assigned to communicate with a first set of devices 314 and execute processing tasks associated with the first set of devices 314. A remote core 306 of the primary processor module 302 is assigned to communicate with a second set of devices 316 and 318 and execute processing tasks associated with the second set of devices 316 and 318. Additional cores may also be used in accordance with the described system. Alternatively, the eEDI device 102 comprises multiple processors configured to execute processes in parallel and a master processor and remote processor are used. It is to be understood that in an alternative embodiment, the master and remote cores could be designated first and second cores. It is to be further understood that in an alternative embodiment, the master and remote cores could be reversed.

The process control network schematically depicted in FIG. 3 is greatly simplified for purposes of illustration. Those skilled in the art will readily appreciate that both the number of components, at each depicted level of the exemplary process control system, is generally many times greater than the number of depicted components. This is especially the case with regard to the number of depicted field devices. In an actual process control environment, the number of field devices, comprising both input devices (e.g., transmitters and sensors) and output devices (e.g., positioners and actuators) number in the hundreds for an industrial process control system.

In an embodiment, the master core 304 is assigned to communicate with MESH network devices 314 and the remote core 306 is assigned to communicate with other devices, such as Ethernet devices 316 and Serial devices 318. Additionally, the master core 304 executes process control software in the form of control blocks. The control blocks are executed throughout the operation of the process. The master core 304 gathers data from field devices connected to ether the master core 304 or the remote core 306 as necessary. The data is used within the control blocks to determine commands to be provided to the connected field devices in order to maintain the process. In an embodiment, the remote core 306 may also execute control blocks.

The master core 304 process includes digital communication (DCI) blocks configured to map device I/O data from devices that are connected to the remote core 306. The DCI blocks are populated with data from the shared device I/O tables during the "inscan" step of the control process, which occurs immediately before the control blocks execute.

In an embodiment, the remote core 306 is connected to one or more different types of field devices and each field device type requires a different driver, which is software that enables the remote core to communicate with the field device. The remote core maintains multiple drivers as necessary to communicate with each type of connected field device. Each device driver installed is represented in the remote core program by a driver block. The driver block contains a driver name, driver version identifier, and other driver specific configuration parameters that are deployed when the driver is initialized.

The remote core 306 further comprises blocks to control status information on specific buses connected to devices. There are, for example, two types of primary blocks containing Ethernet and serial connection information. The primary blocks also contain information such as assigned IP addresses. These addresses are assigned in such a way as to avoid address conflicts and conform to external network configuration. The serial primary block has additional information such as protocol and baud rate for each serial channel.

The remote core 306 program includes a device block used to report status and configuration information for each device configured to be attached to the remote core. In an embodiment, the remote core 306 supports up to 256 different device blocks.

In an embodiment, aspects of the invention implement different methods of time stamping data depending on how time stamps are applied by a driver of a remote device. In the case where the driver does not append any time information, the internally generated time will be used with the data is first installed into the DCI block on the master core side.

If the driver implements its own time stamp scheme, the time stamp is applied when it is read from the remote device. The remote core maintains a time that is adjusted by the master core time services.

A third time stamping scheme comprises passing a remote time stamp from the device through the driver without modification.

The master core 304 and remote core 306 are further configured to indicate errors to the system when it is detected that they are malfunctioning, or if they are incapable of performing. For instance, if devices are scheduled to be scanned faster than possible, a scan overrun error is indicated. If more devices are installed on the core than the core can handle, a lack of memory error is indicated. If the core runs out of CPU resources, an error is indicated.

In an embodiment, the eEDI device 102 further comprises a second redundant processor module, or shadow processor module 308, with the same number of cores as the first processor module, or primary processor module 302. Both the primary module 302 and the shadow module 308 receive the clock signal, which indicates, for example, presence. Both are powered by a power source. The shadow module 308 has communication and processing tasks split between the cores in the same way as the primary module 302 described above. Generally, the shadow module 308 takes over for the primary module 302 in the event that the primary module 302 can no longer function. In this way, even if the primary module 302 breaks, the process control system will be able to continue operation based on the processes of the shadow module 308.

Each master and remote core on the primary and shadow modules 302, 308 are related via a redundancy scheme. A redundancy scheme defines the operations of each core with respect to its redundant partner core. It also defines the method with which the primary core and shadow core communicate and stay synchronized. In an embodiment, the redundancy scheme between the primary master core and the shadow master core is different than the redundancy scheme between the primary remote core and the shadow remote core. For example, the primary master core and the shadow master core implement a tightly coupled redundancy scheme while the primary remote core and the shadow remote core implement a hot-standby, single side scan, or other known redundancy scheme.

In an embodiment, the process of "marrying" a new shadow module 308 to a primary module 302 running alone is executed without interrupting the primary module significantly. In an embodiment, the marriage process takes less than or equal to one second. The primary module 302 detects that a new module is available to join up and act as shadow module 308. The software images on the primary module 302 and new shadow module 308 are compared and the new shadow module software image is altered to match that of the primary module if necessary. All data from the primary master core 304 of the primary module 302 necessary for redundant operation is copied to the shadow master core 310 of the shadow module 308 over a high speed interlink between the modules. The copied data includes all variable data that controls the execution of the primary module 302, such as allocated memory, task stacks which preserves all required CPU register states, and communication buffers which preserves data traffic in transition.

The primary master core 304 and shadow master core 310 are fully synchronized over a high speed interface. The synchronization of the master cores enables bumpless control failover with fully connected communications maintained. In an embodiment, both COMEX and TCP/IP stack messages are fully maintained through a failover situation. Failover transitions are accomplished with no control parameter changes or control state changes, with the only control artifact being a pause of less than one second in control data flow to and from external devices.

The redundancy system of the master cores 304, 310 includes data from remote devices (connected to the remote cores). The data is scanned by the primary remote core 306 and written to the shared device I/O table. The primary master core 304 reads the data on the device I/O table and then the data is copied to the shadow master core 310 immediately. Both the primary master core 304 and the shadow master core 310 then use the data to execute the control process, maintaining synchronization of I/O values.

All writes from the control blocks of the primary and shadow master cores to the device I/O tables are performed by both the primary master core 304 and the shadow master core 310 and compared, allowing both cores to maintain synchronized copies of all output data in each device table in the event of failover.

In an embodiment, the redundancy system of the remote cores 306, 312 is different than that of the master cores 304, 310, which operate in lock-step. For example, remote cores 306, 312 are capable of performing different actions and running different types of operations than the master cores 304, 310. While different, these operations are coordinated by the master cores, which makes device input data immediately available. The primary remote core 306 scans all I/O data from the connected remote devices 316 and 318. The shadow remote core 312 only forms connections to the remote devices 316 and 318 but does not scan the devices. This enables the shadow remote core 312 to take over from the primary remote core 306 quickly if necessary, but the I/O devices are not burdened with double the scan messages.

A failover condition for the remote core 306 is signaled when it is detected that the shadow remote core 312 has connections to more devices than the primary remote core 306. If this is the case, the shadow remote core 312 takes over the duties of the primary remote core 306.

In an alternative embodiment, the primary remote core 306 and the shadow remote core 312 work in concert, where each device would be scanned by the primary remote core 306 if there was a connection to the primary remote core 306, but if a device was only connected to the shadow remote core 312, the shadow remote core 312 would execute scanning of that device.

In an embodiment, each remote core maintains an independent Ethernet connection to the remote devices.

In an embodiment, synchronization of the primary and shadow modules is implemented by requiring that certain important tasks be executed by both modules before moving on to other tasks. The synchronization code is placed in the software of each module, protecting important parts of the code such as changing values in a database or reading values from other memory. When one of the modules hits a synchronization point, it waits for a span of time for the other module to also reach it. Typically, the synchronization occurs very quickly as the modules are tightly synchronized. However, if the two modules fail to meet at a synchronization point within a time limit, the modules attempt to resolve a hardware issue or perform a "hot re-marry" process according to the marriage process described above. In an embodiment, the synchronization time limit is 8 milliseconds.

Referring to primary module 302 for purposes of illustration, the master core 304 and the remote core 306 are connected and communicate with each other during operation. The remote core protocols interact with the master core 304 during the input scanning, or "inscan", and output writing, or "outscan", and maintenance periods of the control cycle. "Inscan" is a stage prior to the execution of the control blocks wherein data values from the field devices are gathered into the master core blocks for use during control block execution. "Outscan" is a stage after the execution of the control blocks where data values calculated by the control block execution are sent to the field devices to maintain the operation of the process. In this way, the process control system forms a feedback loop, enabling the control system to react to event and act to correct issues with the process. In an embodiment, the interaction between master core 304 and remote core 306 uses three data stores in shared memory. The data stores are the device I/O data, the device configuration data, and the driver status data. The master core 304 and the remote core 306 also communicate using a messaging service apart from the shared memory data stores. In an embodiment, the primary master core 304 and the shadow master core 310 also share data as part of the I/O scanning, or inscan, process as part of the master core's cyclic process.

Figure 4:
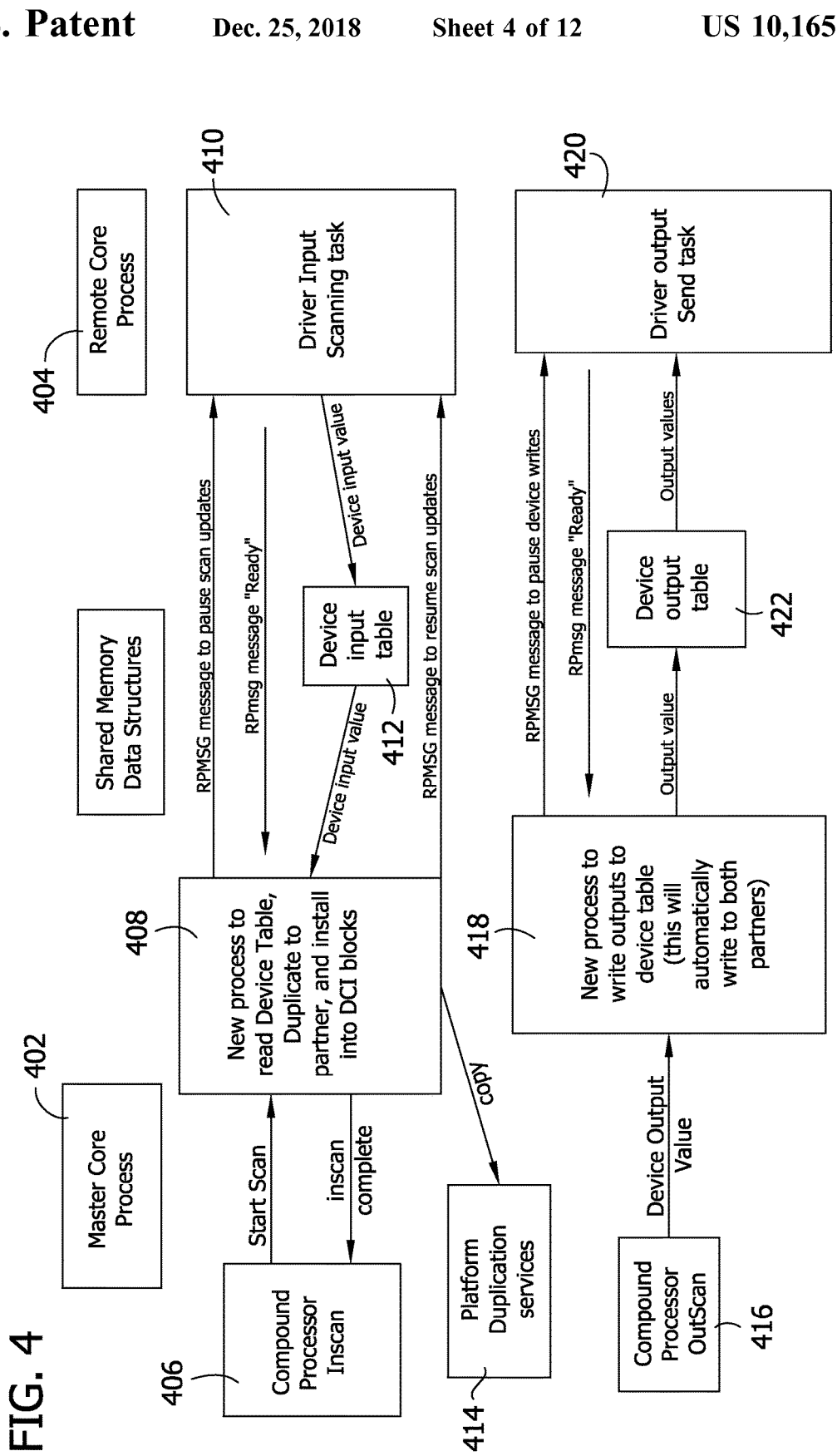
FIG. 4 is a diagram showing an exemplary interaction between a master core and a remote core during inscan and outscan processes.

FIG. 4 shows the data interaction between a master core process 402 and a remote core process 404 for data inscan and outscan according to an embodiment of the invention. As shown, the master core process 402 and the remote core process 404 interact to link device data and status to the blocks and driver functionality in the master core process 402. At the beginning of a compound processor inscan 406, a master core interaction process 408 messages the remote core 404, instructing it to pause scan updates of a device input table 412. The remote core pauses scan updates from a driver input scanning task 410 and replies to the master core interaction process 408 that it is ready for scanning. The master core interaction process 408 reads the device input table 412 data, duplicates the data to its partner processes 414, and installs the device data into blocks. The master core process then messages the remote core to resume the scan updates. The remote core resumes updating the device table.

When the master core 402 executes an outscan 416, the processor passes device output values to a master core interaction process 418, which interacts with the remote core 404. The master core interaction process 418 sends a message to the remote core 404 to pause writing to devices by a driver output send task 420. The remote core pauses device writing tasks and responds to the master core process that it is ready for the outscan. The master core interaction process 418 writes the output values to a shared device output table 422. The remote core 404 reads the output values from the device output table to the driver output send task 420 and then resumes device writing.

Figure 5:
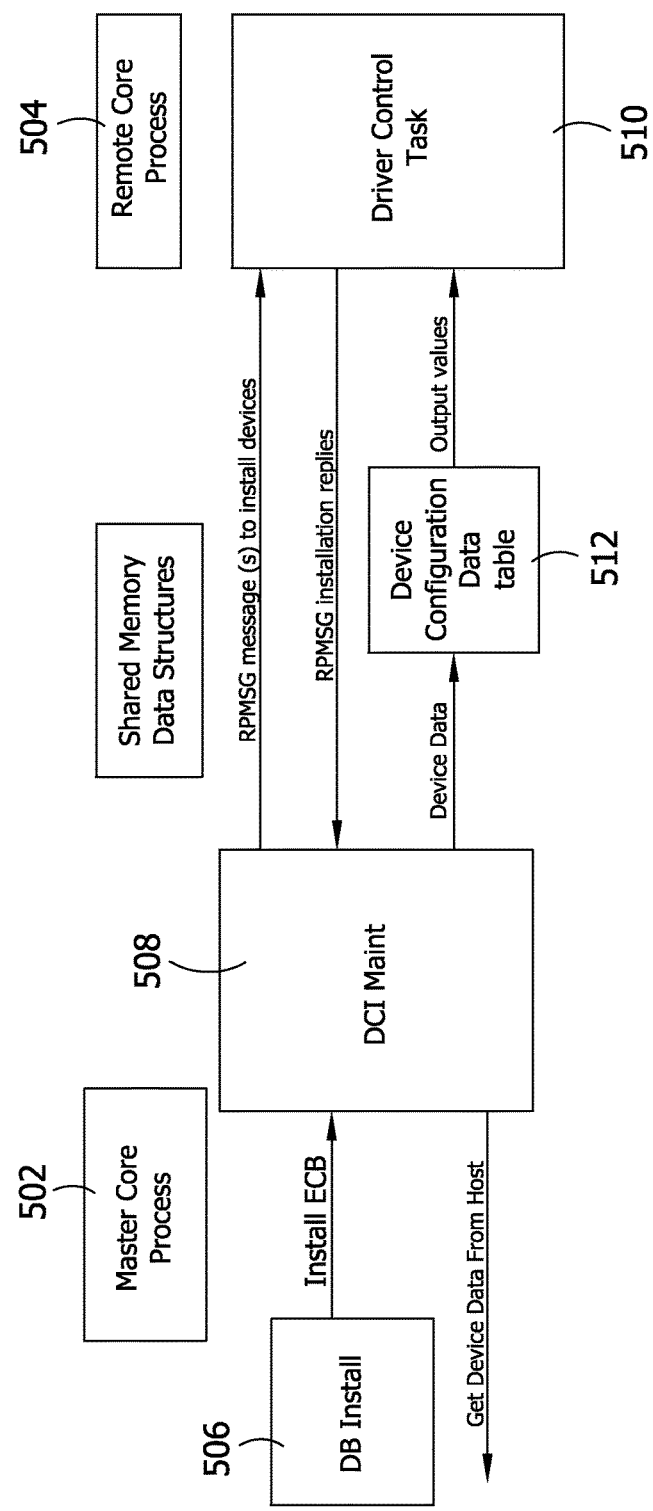
FIG. 5 is a diagram showing an exemplary interaction between a master core and a remote core during a device installation.

In an embodiment, the master core interacts with the remote core to perform maintenance tasks such as installing devices. In FIG. 5, an exemplary process of installing a device is described. A master core 502 executes a maintenance process 508, which obtains device data from a device host 506. A maintenance process 508 sends a message to a remote core 504, instructing it to install the device by a driver control task 510. The remote core task 510 responds, confirming the installation instruction. The maintenance process 508 writes the device data to a shared device configuration data table 512. The remote core task 510 reads the device data from the device configuration data table 512 and completes the device installation.

The device configuration table in the illustrated embodiment contains configuration information for each installed device. When a new device and associated block are added to the system, the block contains file information for the device and the file information is loaded to the system in a DCI block.

Figure 6:
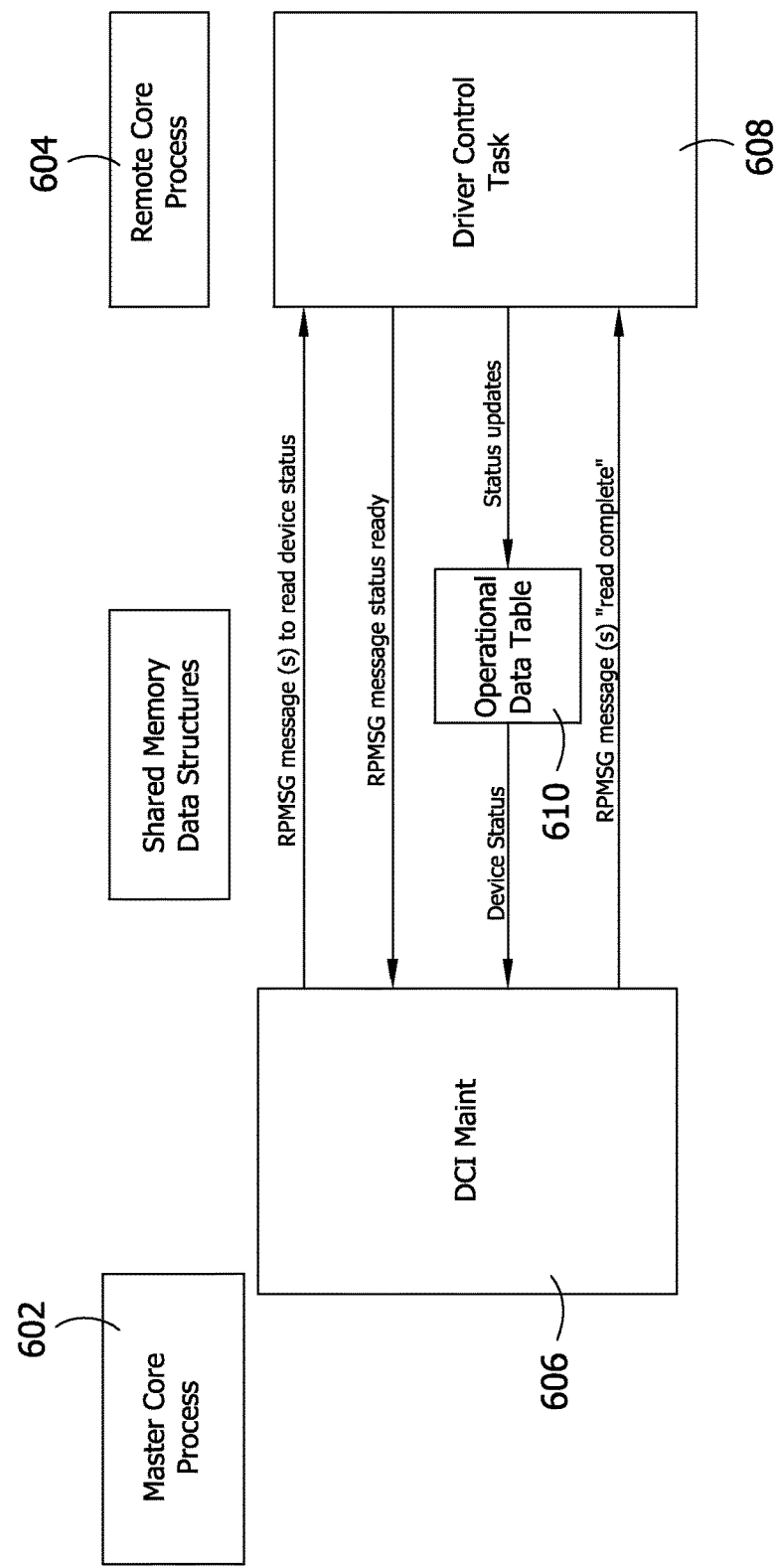
FIG. 6 is a diagram showing an exemplary interaction between a master core and a remote core during a device status request.

Referring now to FIG. 6, a master core process 602 monitors the status of devices connected to a remote core process 604. In the illustrated embodiment, the master core 602 executes a maintenance process 606 that interacts with the remote core 604. The maintenance process 606 sends a message to the remote core 604 instructing it to read a device status. The remote core 604 reads the status and responds that the status is ready by a driver control task 608. The remote core 604 also writes the device status data to a shared operational data table 610. The maintenance process 606 then reads the device status from the operational data table 610. Upon successfully reading the device status data from the operational data table 610, the maintenance process 606 sends a message to the remote core 604 that the status read is complete.

The device I/O data table 610 is a shared memory space between the master core 602 and the remote core 604. It contains points of I/O data to and from remote devices. Device input data is updated by the primary remote core scanning applications for input data and is read by the master core 602 just before the control blocks execute for a cycle.

After the device I/O data is read from the table 610, it is exchanged from the primary module (e.g., primary module 302) to the shadow module (e.g., shadow module 308) and then the data is copied into the DCI control blocks. After the control blocks are executed, newly calculated values are written to the device I/O table 610 and then read by the remote core 604 to distribute to the connected devices.

FIGS. 7-12 show exemplary architectures of the Embedded External Device Integrator (eEDI) connected to a variety of field devices.

Figure 7:
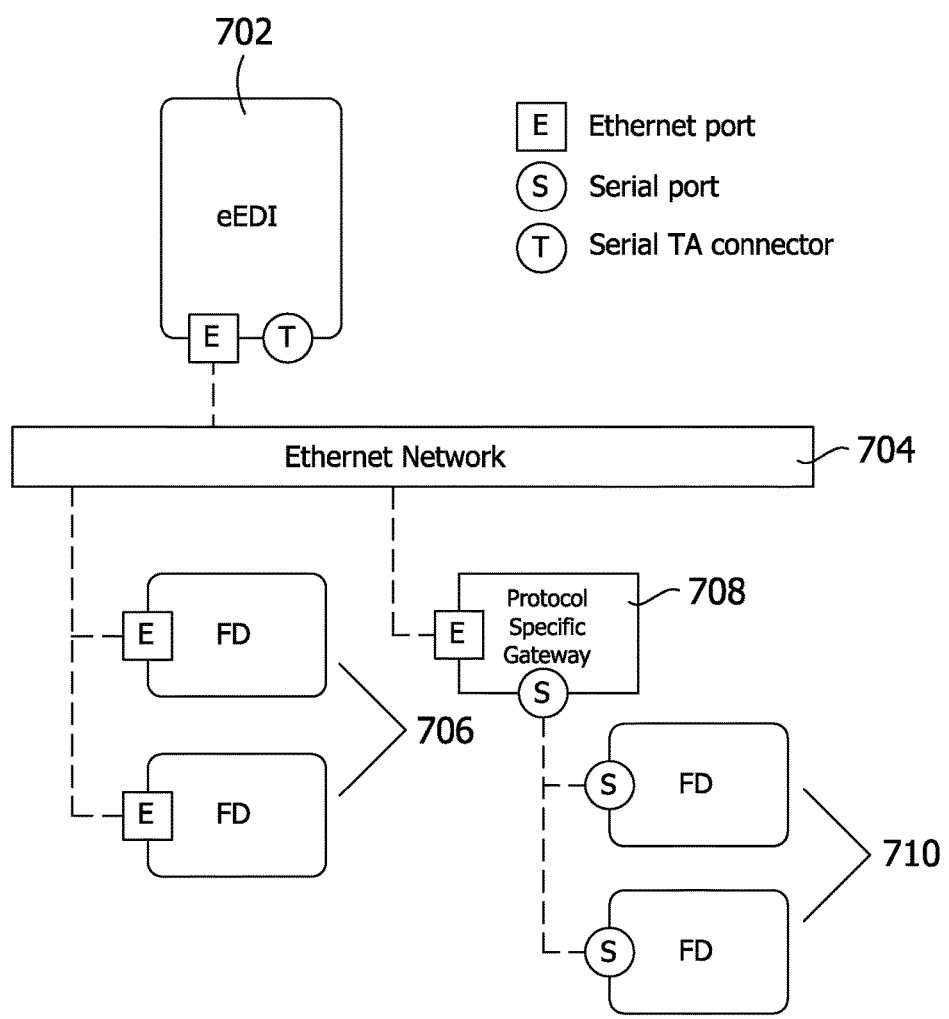
FIG. 7 is a diagram of an exemplary layout of single eEDI system connected to field devices by Ethernet.

FIG. 7 shows a single eEDI device 702 connected to several field devices via an Ethernet network 704. The eEDI device 702 includes an Ethernet port connected to the Ethernet network 704. Field devices 706 are connected via Ethernet ports directly to the Ethernet network 704. A gateway device 708 is also connected to the Ethernet network 704 and is used to translate from Ethernet protocol to a serial protocol. Field devices 710 are connected via serial port to the gateway device 708. The gateway device 708 enables the communication between the eEDI 702 Ethernet connection and the field devices 710 connected by serial ports.

Figure 8:
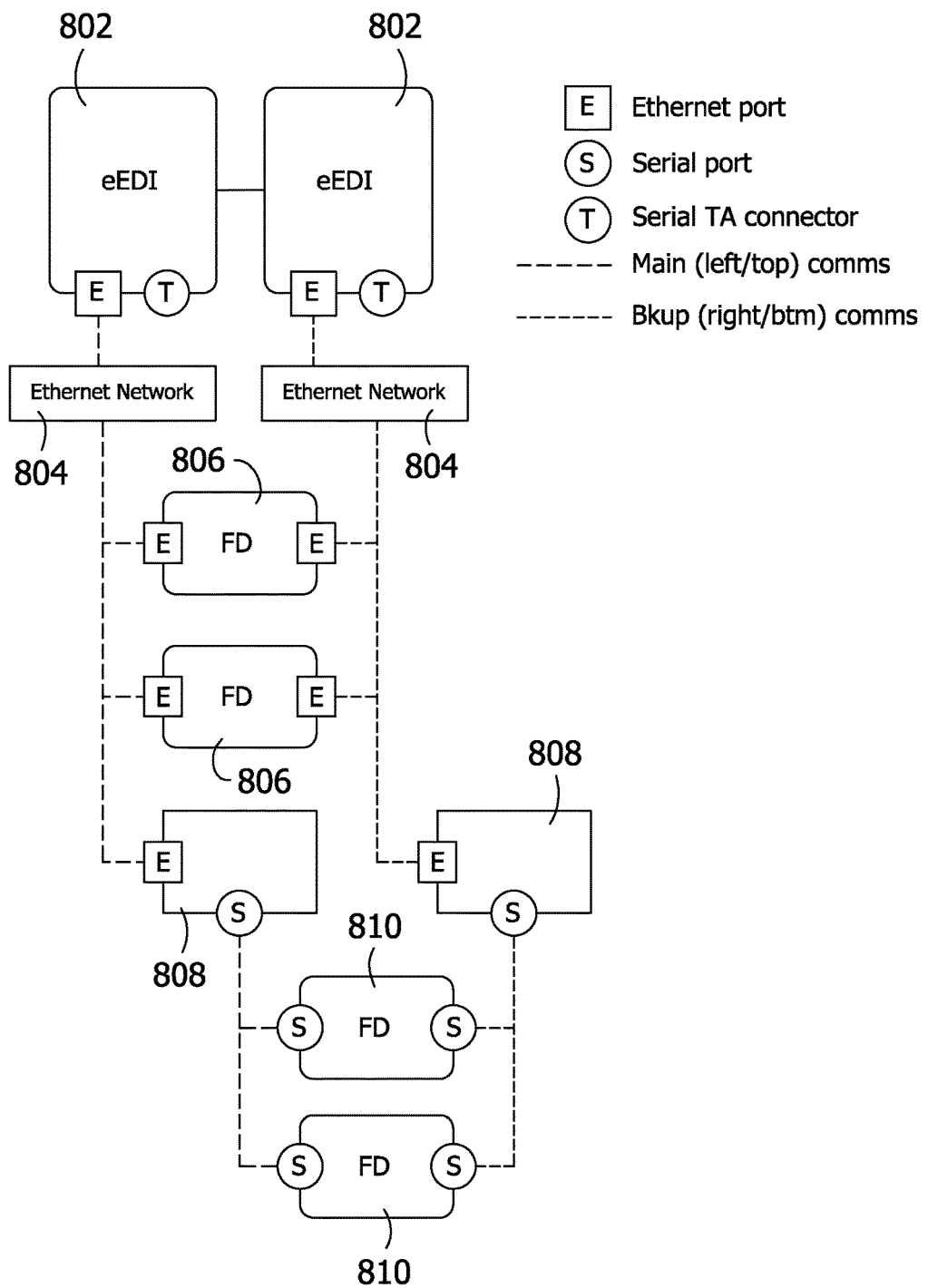
FIG. 8 is a diagram of an exemplary layout of a system with two eEDI's and two Ethernet networks.

FIG. 8 shows redundant eEDI devices 802 connected to two separate Ethernet networks 804. Separate physical networks have the advantage of preventing network issues with one network from affecting the other network. Additionally, if a device has identical IP addresses or MAC addresses on two of its ports, the device cannot connect with both ports on the same network.

The eEDI devices 802 are communicatively connected to each other and each is connected to a separate Ethernet network 804. Field devices 806 each have two Ethernet ports with identical IP addresses and are connected to the both Ethernet networks 804. As in the previous figure, there are gateway devices 808 connected to Ethernet networks 804. Each gateway device 808 is connected to one of the Ethernet networks 804 via an Ethernet port and they share identical IP addresses. The gateway objects 808 translate the Ethernet protocol into a serial protocol for field devices 810. Field devices 810 are connected to both gateway objects 808 via two serial ports and can communicate through the gateway objects 808 to the eEDI devices 802. This architecture cannot maintain redundancy for connected single-ported field devices.

Figure 9:
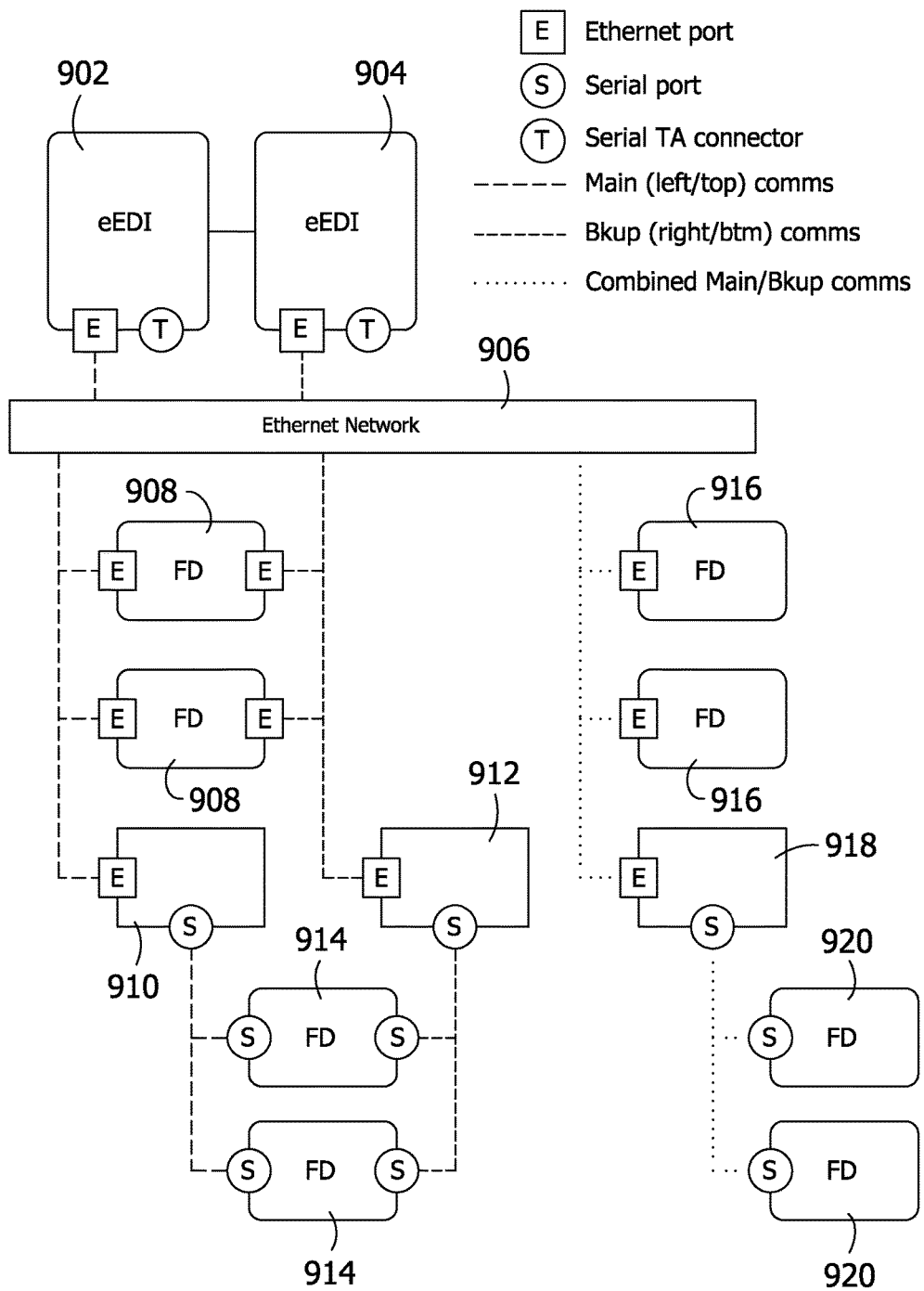
FIG. 9 is a diagram of an exemplary layout of a system with two eEDI's and a shared Ethernet network.

FIG. 9 shows redundant eEDI devices 902 and 904 connected to a single Ethernet network 906. In this embodiment, each eEDI 902, 904 has a unique IP address to permit its connection to the single Ethernet network 906. Similar to FIG. 8, there are field devices 908 connected to the Ethernet network 906. Field devices 908 each have two Ethernet ports with different IP addresses. One of the Ethernet ports is connected to the main eEDI 902 and the other port is connected to the shadow eEDI 904. There are also gateway devices 910 and 912 connected to the Ethernet network 904 with separate IP addresses. Gateway device 910 is connected to main eEDI 902 and gateway device 912 is connected to eEDI 904. The gateway devices 910 and 912 translate the Ethernet protocol into a serial protocol for field devices 914. Each field device 914 has two serial ports, one of which is connected to gateway device 910 and the other of which is connected to gateway device 912.

In addition to field devices 908 and 914, field devices 916 are connected to the Ethernet network 906. Field devices 916 each have a single Ethernet port with a unique IP address. Field devices 916 maintain combined connections via the Ethernet ports to both eEDI 902 and eEDI 904 for redundancy purposes. Gateway device 918 is connected to eEDI 902 and eEDI 904 along a single combined Ethernet connection as well. Gateway device 918 translates the Ethernet protocol into a serial protocol for both field devices 920. Field devices 920 communicate with both eEDI 902 and eEDI 904 through single serial ports using gateway device 18.

In an embodiment, a single-ported field device connected to an eEDI system can handle multiple simultaneous connections, so the primary module (e.g., primary module 302) and the shadow module (e.g., shadow module 308) each establish separate connections with the field device. The primary module in this embodiment performs the scanning tasks and writing tasks, while the shadow module maintains contact through minimal periodic communications to verify connectivity.

Alternatively, if the single-ported field device cannot handle multiple simultaneous connections, then the shadow module will only perform simple pings to verify connectivity without maintaining a connection.

In an embodiment, a dual-ported field device connected to a common network maintains a connection with the primary module (e.g., primary module 302) with one port and the shadow module (e.g., shadow module 308) with the other port, as shown in FIG. 9. This enables the shadow module to take over in the event of port failure at the field device. However, If there are multiple field devices connected in this configuration and some of the field devices have failed primary ports while others have failed shadow ports, the system must determine which module to run as primary and thereby, which field devices to maintain.

Alternatively, the common network allows for device port switching, where the primary module switches the port it's connected to when a port failure is detected on the other port.

In an embodiment, a field device comprises internal redundancy. If the primary module of the field device fails, then the shadow module of the field device takes over the primary module's IP address and assumes control. The field device is effectively a single-ported field device.

Figure 10:
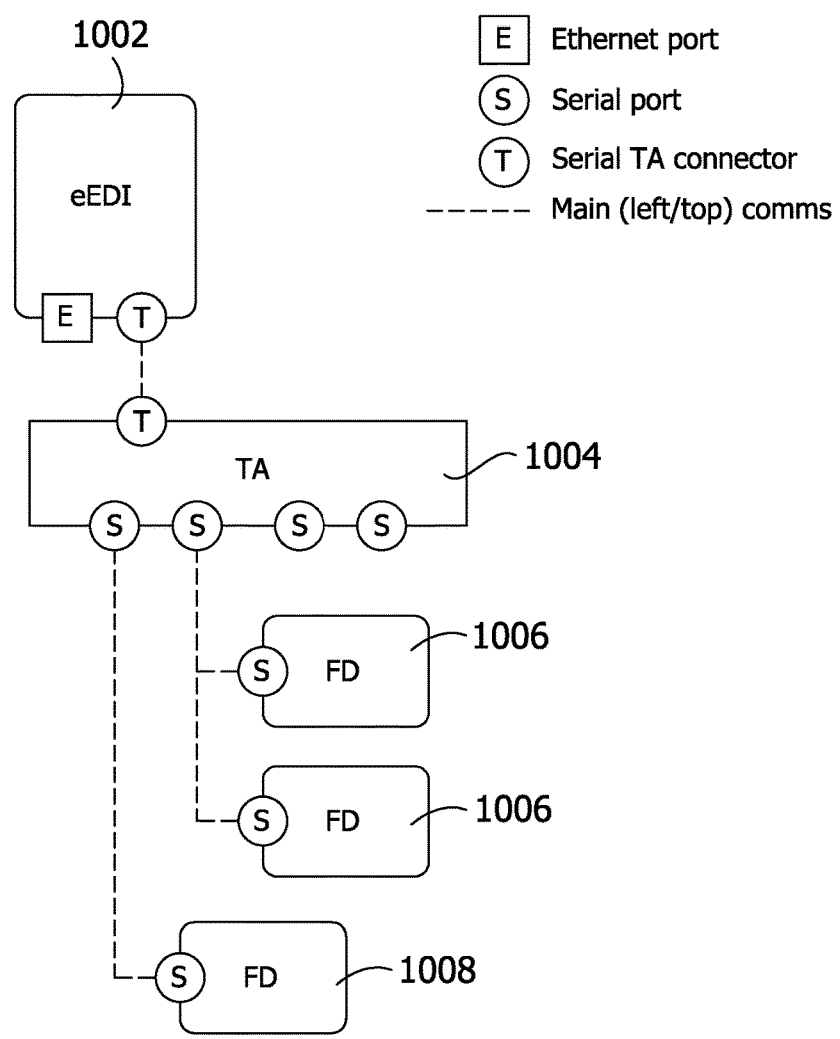
FIG. 10 is a diagram of an exemplary layout of a single eEDI system connected to field devices serially.

FIG. 10 shows a diagram of a single eEDI device 1002 connecting to field devices 1006 and 1008 through a serial port termination assembly (TA) device 1004. The eEDI 1002 connects to the TA 1004 via a serial TA connector. The TA 1004 includes four serial ports, but alternative embodiments may include different numbers of serial ports. Field devices 1006 share a single serial port of TA 1004 and communicate using a protocol that enables shared port usage. Field device 1008 connects to a separate serial port of TA 1004.

Figure 11:
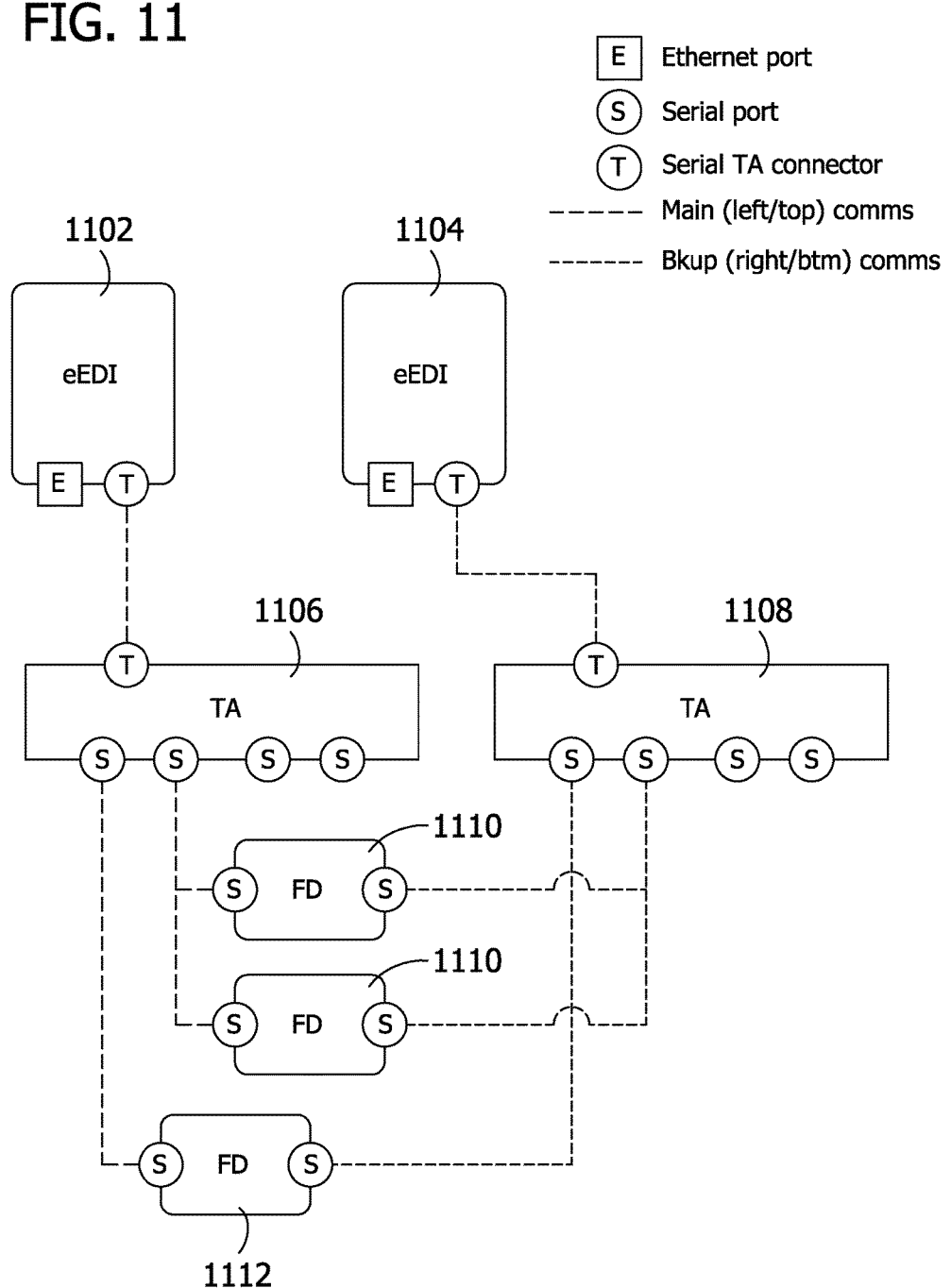
FIG. 11 is a diagram of an exemplary layout of a system with two eEDI's connected serially to dual-port field devices.

Referring now to FIG. 11, a diagram of redundant eEDI devices 1102 and 1104 connected to dual-port field devices 1110 and 1112 via serial ports through serial TA connectors 1106 and 1108 is shown. Primary eEDI 1102 connects to TA 1106 to communicate with field devices 1110 and 1112 via serial ports. Shadow or backup eEDI 1104 connects to TA 1108 to communicate with field devices 1110 and 1112 via secondary serial ports. Field devices 1110 share a single serial port connection on each TA 1106 and 1108 and use a protocol that enables the serial port to be shared. Field device 1112 connects to a separate serial port on each TA 1106 and 1108. Primary eEDI 1102 is responsible for scan and write tasks for the field devices, but in the event of a failure in the system, the shadow eEDI 1104 takes over the responsibility and becomes the primary eEDI.

Figure 12:
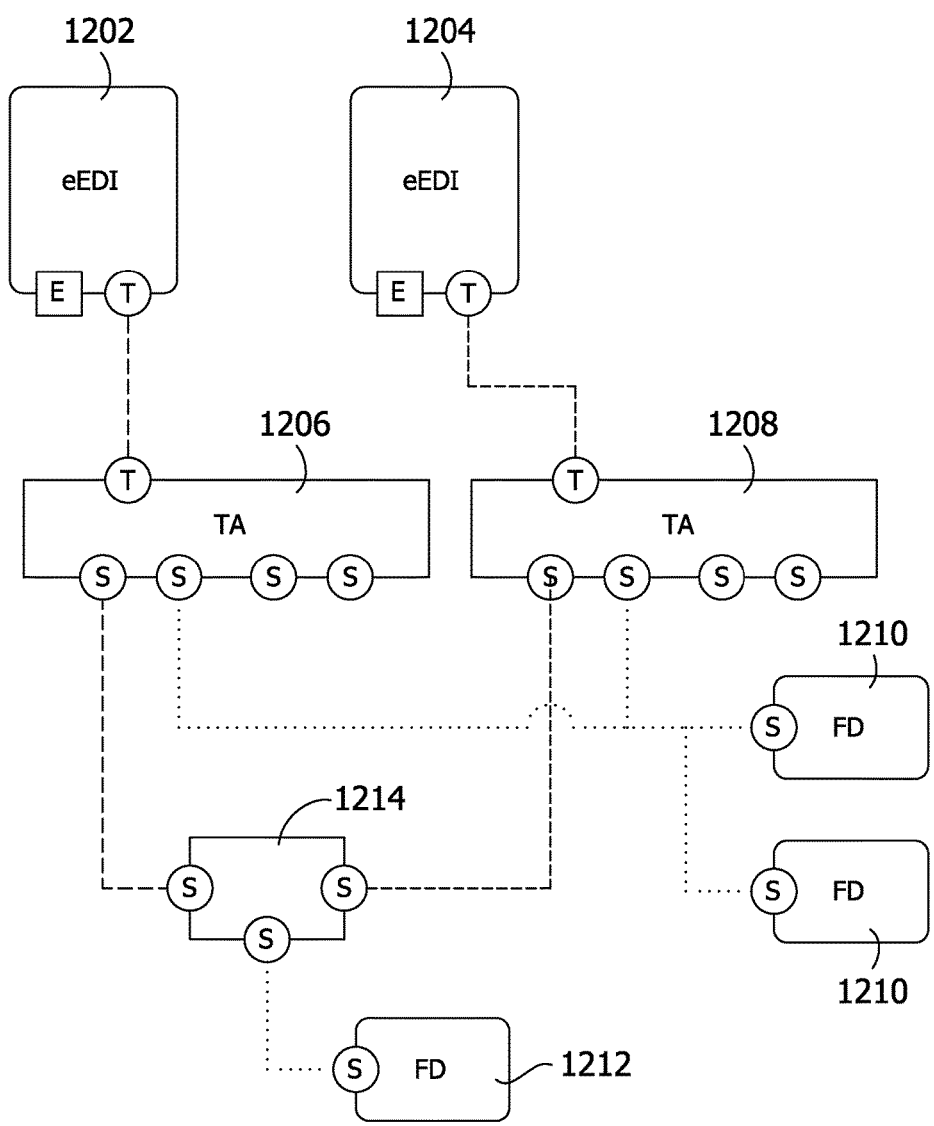
FIG. 12 is a diagram of an exemplary layout of a system with two eEDI's connected serially to single-port field devices.

FIG. 12 shows a diagram of redundant eEDI devices 1202 and 1204 connected to serial TA connectors 1206 and 1208. Field devices 1210 are single-ported field devices connected to serial ports on both TA devices 1206 and 1208. The serial connection is shared between primary eEDI 1202 and shadow eEDI 1204 using a protocol that prevents collisions. In an embodiment, the primary eEDI 1202 talks on the shared bus while both the primary eEDI 1202 and shadow eEDI 1204 listen on the bus. The field device 1212 is connected to both TA devices 1206 and 1208 through a switch device 1214. The connections between TA devices 1206 and 1208 and the switch device 1214 use a different protocol which does not prevent collisions like the connection to field devices 1210. The switch device 1214 is necessary for the single-ported field device 1212 to be connected to both eEDI devices 1202 and 1204.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the software aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the software aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A multicore system for enabling control of field devices in a process control system comprising:
    a primary control processing device coupled to a first network of a first plurality of field devices and a second network of a second plurality of field devices for processing communications between the multicore system and the first plurality of field devices and between the multicore system and the second plurality of field devices, said primary control processing device comprising:
        a primary master core configured for controlling communications on the first network among the first plurality of field devices, the primary master core further configured for executing processing tasks associated with the first plurality of field devices; and
        a primary remote core configured for controlling communications on the second network among the second plurality of field devices, the primary remote core further configured for executing processing tasks associated with the second plurality of field devices such that the primary remote core shares processing with the primary master core; and
    a shadow control processing device coupled to the first and second networks for processing redundant communications between the multicore system and the first plurality of field devices and between the multicore system and the second plurality of field devices, said shadow control processing device comprising:
        a shadow master core configured for controlling communications on the first network among the first plurality of field devices; and
        a shadow remote core configured for controlling communications on the second network among the second plurality of field devices.

2. The system of claim 1, wherein the primary master core and the shadow master core are synchronized such that data received by the primary master core is shared with the shadow master core and both the primary master core and the shadow master core process the data simultaneously.

3. The system of claim 1, wherein the primary remote core is connected to the second plurality of field devices and processes all data received from the second plurality of field devices and the shadow remote core is connected to the second plurality of field devices but does not process the data from the second plurality of field devices unless the primary remote core fails.

4. The system of claim 1, wherein the primary master core and the shadow master core are synchronized such that data received by the primary master core is shared with the shadow master core and both the primary master core and the shadow master core process the data simultaneously; and
    wherein the primary remote core is connected to the second plurality of field devices and processes the data received from the second plurality of field devices and the shadow remote core is connected to the second plurality of field devices but does not process the data from the second plurality of field devices unless the primary remote core fails.

5. The system of claim 1, wherein the first network is a mesh network.

6. The system of claim 1, wherein the second network uses at least one of the following: a MODBUS TCP/IP protocol; an Ethernet protocol; and a serial protocol.

7. The system of claim 1, further comprising a shared memory coupled to both the master core and the remote core.

8. The system of claim 7, wherein the master core and the remote core communicate by writing to and reading from the shared memory.

9. The system of claim 1, wherein the primary master core and the shadow master core are tightly coupled to provide fault tolerant control to the first and second pluralities of field devices via one or both of the remote cores.

10. The system of claim 1, wherein the remote cores support multiple communication drivers for communication with the second plurality of field devices on the second network.

11. A method for enabling control of field devices in a process control system using a multi-core processing device comprising:
controlling, by a primary control processing device, communications between the multi-core processing device and a first plurality of field devices on a first network and between the multi-core processing device and a second plurality of field devices on a second network, said primary control processing device comprising a primary master core and a primary remote core and coupled to the first and second networks, said controlling comprising:
receiving, by the primary master core, data from the first plurality of field devices on the first network;
receiving, by the primary remote core, data from the second plurality of field devices on the second network;
receiving, by the primary master core, data from the second plurality of field devices on the second network via the primary remote core;
sharing, by the primary master core, the data received thereby with a shadow master core;
processing, by the primary master core, the data received thereby from the first plurality of field devices into first processed control data;
processing, by the primary remote core, the data received thereby from the second plurality of field devices into second process control data;
sending, by the primary master core, the first processed control data to the first plurality of field devices; and
sending, by the primary remote core, the second processed control data to the second plurality of field devices; and
controlling, by a shadow control processing device, redundant communications between the multi-core processing device and the first plurality of field devices and between the multi-core processing device and the second plurality of field devices, said shadow control processing device comprising the shadow master core and a shadow remote core and coupled to the first and second networks, said controlling comprising:
receiving, by the shadow master core, data from the primary master core;
processing, by the shadow master core, the data received from the primary master core into redundant processed control data; and
maintaining, by the shadow remote core, connections to the second plurality of field devices on the second network.

12. The method of claim 11, further comprising synchronizing the primary master core and the shadow master core such that both the primary master core and the shadow master core process the shared data simultaneously.

13. The method of claim 11, wherein the primary remote core is connected to the second plurality of field devices, and wherein the shadow remote core is connected to the second plurality of field devices but does not process the data from the second plurality of field devices unless the primary remote core fails.

14. The method of claim 11, further comprising synchronizing the primary master core and the shadow master core such that data received by the primary master core is shared with the shadow master core and both the primary master core and shadow master core process the data simultaneously; and
wherein the primary remote core is connected to the second plurality of field devices and processes the data received from the second plurality of field devices and the shadow remote core is connected to the second plurality of field devices but does not process the data from the second plurality of field devices unless the primary remote core fails.

15. The method of claim 11, further comprising configuring the second network to communicate according to at least one of the following: MODBUS TCP/IP protocol; an Ethernet protocol; and a serial protocol.

16. The method of claim 11, wherein the master core and the remote core communicate by writing to and reading from a shared memory.

17. The method of claim 11, wherein the primary master core and the shadow master core are tightly coupled to provide fault tolerant control to the first and second pluralities of field devices via one or both of the remote cores.

18. The method of claim 11, wherein the remote cores support multiple communication drivers for communication with the second plurality of field devices on the second network.

19. A process control system comprising:
a first network connecting a first plurality of field devices;
a second network connecting a second plurality of field devices;
an embedded external device integrator comprising:
a primary control processing device coupled to the first network of the first plurality of field devices and to the second network of the second plurality of field devices for processing communications between the process control system and the first plurality of field devices and between the process control system and the second plurality of field devices, said primary control processing device comprising:
a primary master core configured for controlling communications on the first network among the first plurality of field devices, the primary master core further configured for executing processing tasks associated with the first plurality of field devices; and
a primary remote core configured for controlling communications on the second network among the second plurality of field devices, the primary remote core further configured for executing processing tasks associated with the second plurality of field devices such that the primary remote core shares processing with the primary master core; and a shadow control processing device coupled to the first and second networks for processing redundant communications between the process control system and the first plurality of field devices and between the process control system and the second plurality of field devices, said shadow control processing device comprising:
   a shadow master core configured for controlling communications on the first network among the first plurality of field devices; and
   a shadow remote core configured for controlling communications on the second network among the second plurality of field devices.

20. The process control system of claim 19, wherein the primary master core and the shadow master core are synchronized such that data received by the primary master core is shared with the shadow master core and both the primary master core and the shadow master core process the data simultaneously; and
   wherein the primary remote core is connected to the second plurality of field devices and processes the data received from the second plurality of field devices and the shadow remote core is connected to the second plurality of field devices but does not process the data from the second plurality of field devices unless the primary remote core fails.

* * * * *